United States Patent
Kawashima (10) Patent No.: US 11,386,032 B2
(45) Date of Patent: Jul. 12, 2022

(54) NETWORK SYSTEM

(71) Applicant: TOYOTA JIDOSHA KABUSHIKI KAISHA, Toyota (JP)

(72) Inventor: Satoshi Kawashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 16/561,671

(22) Filed: Sep. 5, 2019

(65) Prior Publication Data

US 2020/0151132 A1    May 14, 2020

(30) Foreign Application Priority Data

Nov. 9, 2018   (JP) .............................. JP2018-211500

(51) Int. Cl.
*G06F 13/40* (2006.01)
*B60R 16/023* (2006.01)
*G07C 5/08* (2006.01)
*G06F 13/38* (2006.01)

(52) U.S. Cl.
CPC ...... *G06F 13/4027* (2013.01); *B60R 16/0231* (2013.01); *G07C 5/08* (2013.01); *G06F 13/38* (2013.01)

(58) Field of Classification Search
CPC ........ B60R 16/0231; G07C 5/08; G06F 13/38
See application file for complete search history.

(56) References Cited

U.S. PATENT DOCUMENTS

| | | | |
|---|---|---|---|
| 7,369,496 B1* | 5/2008 | Wiggins | H04L 47/10 370/235 |
| 10,919,463 B1* | 2/2021 | Brown | B60W 20/50 |
| 2006/0015231 A1 | 1/2006 | Yoshimura et al. | |
| 2007/0237103 A1* | 10/2007 | Reynolds | H04L 43/106 370/310.2 |
| 2008/0046142 A1* | 2/2008 | Jordan | H04L 12/40195 701/36 |
| 2008/0218246 A1 | 9/2008 | Kanazawa et al. | |

(Continued)

FOREIGN PATENT DOCUMENTS

| | | |
|---|---|---|
| JP | 2006-051922 A | 2/2006 |
| JP | 2006-180109 A | 7/2006 |

(Continued)

OTHER PUBLICATIONS

PCA9601: Dual Bidirectional Bus Buffer; Product Data Sheet; Rev. 3,Sep. 24, 2015.

*Primary Examiner* — Walter J Divito
*Assistant Examiner* — Anthony Luo
(74) *Attorney, Agent, or Firm* — Oliff PLC (57) ABSTRACT

A network system is mounted on a vehicle, and includes a plurality of sensors, a first bus used when the sensors transmit sensing data, a plurality of actuators, a second bus used when the actuators receive control data, a central electronic control unit that performs an operation based on the sensing data and generates the control data, a third bus used when the central electronic control unit receives the sensing data and transmits the control data, and a repeater. The repeater is configured to pass data flowing on the first bus to the third bus, pass data flowing on the third bus to the second bus, and block the flow of data from the third bus to the first bus and the flow of data from the second bus to the third bus.

11 Claims, 5 Drawing Sheets

(56) References Cited

U.S. PATENT DOCUMENTS

| | | | |
|---|---|---|---|
| 2011/0035521 A1 | 2/2011 | Horihata | |
| 2014/0254823 A1* | 9/2014 | Yan | H03G 3/3005 |
| | | | 381/92 |
| 2017/0359128 A1 | 12/2017 | Xi et al. | |

FOREIGN PATENT DOCUMENTS

| | | |
|---|---|---|
| JP | 2015-067187 A | 4/2015 |
| JP | 2017-225120 A | 12/2017 |

* cited by examiner

NETWORK SYSTEM

INCORPORATION BY REFERENCE

The disclosure of Japanese Patent Application No. 2018-211500 filed on Nov. 9, 2018 including the specification, drawings and abstract is incorporated herein by reference in its entirety.

BACKGROUND

1. Technical Field

The present disclosure relates to a network system mounted on a vehicle or the like.

2. Description of Related Art

A plurality of in-vehicle devices, referred to as electronic control units (ECUs), is mounted on a vehicle, and they are connected to buses, constituting a network system. Each ECU includes a processor, and acquires, from various sensors provided in the vehicle, information on the state of each part of the vehicle, the traveling state of the vehicle, such as the speed, the status of a road and a target around the vehicle, an operation performed on the vehicle, or the like. Alternatively, each ECU acquires the above information from other ECUs.

Each ECU performs processing based on the acquired information, and based on the processing result, controls each of various actuators, such as a brake and a powertrain, or transmits data to other ECUs. Each ECU shares functions, such as driving assistance, which are required for the vehicle, and has its own role.

In addition to the ECU that implements the driving assistance function and the like, there is a sensor ECU that is provided in each sensor, and individually operates the sensor, or, for example, processes or corrects output from the sensor. Moreover, there is an actuator ECU that is provided in each actuator, receives control data from other ECUs, and individually operates the actuator based on the received control data.

With advancements of vehicle functions, the number of ECUs is increasing. In particular, in order to improve the driving assistance function, a new ECU is provided to perform processing, such as collision avoidance, lane keeping, front vehicle following, speed keeping, parking assistance, and the like. However, when the number of ECUs increases, the wiring length of the bus becomes longer in order to connect the many ECUs, and a waveform distortion of a signal propagating through the bus increases due to a characteristic of the bus or a reflection generated at the connection point with the ECU.

Therefore, a network system disclosed in Japanese Unexamined Patent Application Publication No. 2006-180109 (JP 2006-180109 A) divides the bus and reduces the wiring length of one bus by connecting two networks, each of which includes a plurality of nodes (ECUs), through a gateway. In the network system disclosed in JP 2006-180109 A, two buses are provided to each network, and each node is connected to two buses such that the wiring length of one bus is further shortened.

SUMMARY

Since a number of ECUs having individual functions are provided, the number of processors provided to each ECU increases, and accordingly a cost increases. Further, in a gateway such as the one disclosed in JP 2006-180109 A, in general, a processor performs, for example, an advanced process of selecting and transmitting data from one network to another, based on an identifier included in the data. Accordingly, a cost increases, and the time required for the process becomes relatively long. In particular, the initial delay time when the gateway is started increases. For this reason, a data transmission may be missed or delayed. Further, connecting a plurality of buses to each ECU requires a plurality of controllers that manages the connection with the buses and the transmission and reception of data. Accordingly, the cost increases.

The present disclosure provides an in-vehicle network system at a low cost.

One aspect of the present disclosure is a network system mounted on a vehicle. The network system includes a plurality of sensors, a first bus connected to the plurality of sensors and used when the plurality of sensors transmits sensing data, a plurality of actuators, a second bus connected to the plurality of actuators and used when the plurality of actuators receives control data, a central electronic control unit (ECU) configured to perform an operation based on the sensing data, and generate the control data as data for collectively performing vehicle control using the plurality of actuators, a third bus connected to the central ECU and used when the central ECU receives the sensing data and transmits the control data, and a repeater connected to the first bus, the second bus, and the third bus. The repeater is configured to pass data flowing on the first bus to the third bus while shaping a waveform of the data, pass data flowing on the third bus to the second bus while shaping a waveform of the data, and block the flow of data from the third bus to the first bus and the flow of data from the second bus to the third bus.

Any one of the plurality of sensors may monitor each of the plurality of actuators, and transmit a monitoring result as the sensing data.

When a plurality of pieces of data is simultaneously transmitted, the order of the transmission of the plurality of pieces of data may be adjusted based on a priority given to each frame, which is a transmission unit of the data. A frame of the sensing data may be given a priority higher than a frame of the control data. The repeater may delay, when the frame of the sensing data is input from the first bus while the frame of the control data input from the third bus is passing through the repeater, a passage of the frame of the input sensing data until a passage of the frame of the input control data is completed.

At least a part of the plurality of actuators may transmit or receive a frame of inter-actuator data using the second bus. The frame of the control data may be given a priority higher than the frame of the inter-actuator data. The repeater may delay, when the frame of the control data is input from the third bus while the frame of the inter-actuator data is flowing on the second bus, a passage of the frame of the input control data until the flow of the frame of the flowing inter-actuator data on the second bus is completed.

The repeater may be configured such that the repeater does not pass a data from the third bus to the second bus, when the data is flowing on the third bus and has passed through the repeater from the first bus.

The repeater may include a first circuit connected to the first bus and the third bus, and configured to pass the data flowing on the first bus to the third bus while shaping the waveform of the data, and a second circuit connected to the second bus and the third bus, and configured to pass the data flowing on the third bus to the second bus while shaping the waveform of the data.

The repeater may further include a selector configured to inhibit a passage of the data from the third bus to the second bus when each of the data flowing on the third bus and the first bus is input into the selector, and when the data flowing on the third bus has flowed from the first bus.

The first circuit may include a first delay circuit that delays a passage of data input into the first circuit.

The second circuit may include a second delay circuit that delays a passage of data input into the second circuit.

As described above, with the foregoing aspect of the present disclosure, an in-vehicle network system can be provided at a low cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the network system according to the present disclosure, a bus to which a sensor is connected, a bus to which an actuator is connected, and a bus to which a central ECU is connected are connected to one another via a repeater. The central ECU transmits control data to the actuator based on sensing data received from the sensor, and collectively performs a vehicle control function. Functions of a plurality of conventional ECUs are integrated into the central ECU. Compared to a conventional network system, the network system according to the present disclosure can reduce costs by providing a central ECU, which reduces the number of ECUs, and instead of a gateway, by providing a repeater, which reduces the number of high-cost components, such as processors included in the ECUs or the gateway.

Embodiment

Hereinafter, one embodiment of the present disclosure will be described in detail with reference to the drawings.

Base Configuration

Figure 1:
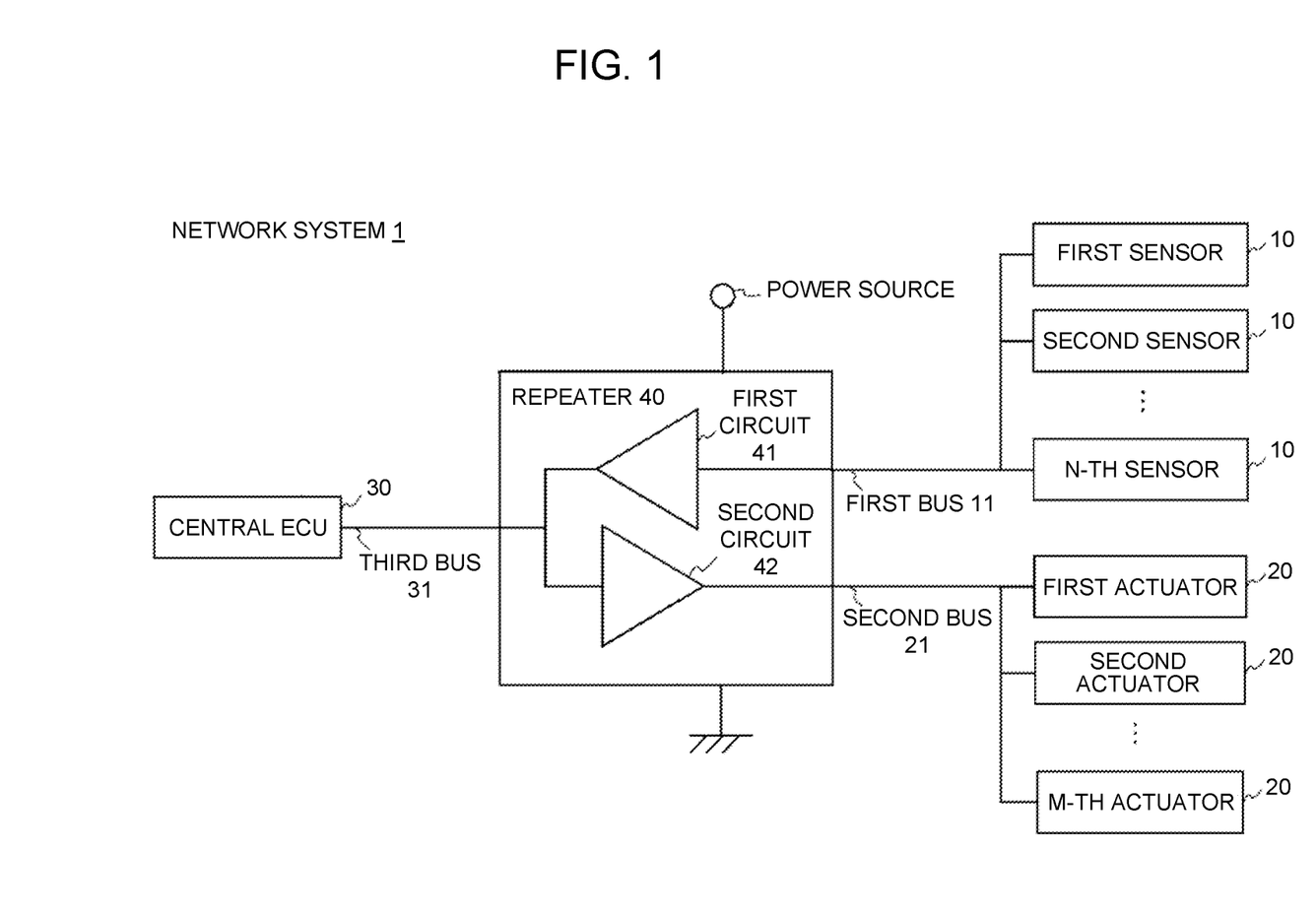
FIG. 1 illustrates a functional block of a network system according to one embodiment of the present disclosure.

FIG. 1 illustrates a functional block diagram of a network system 1 according to the present embodiment. The network system 1 is mounted on a vehicle, and includes a plurality of sensors 10 (a first sensor to an N-th sensor), a plurality of actuators 20 (a first actuator to an M-th actuator), a central ECU 30, a first bus 11, a second bus 21, a third bus 31 and a repeater 40.

Each of the sensors 10 can appropriately detect, for example, the state of each actuator 20 and each part of the vehicle, the traveling state, such as the speed and the acceleration of the vehicle, the environmental status, such as the roads and the targets around the vehicle, the seating status of the occupant, and the content of an operation performed on each part of the vehicle.

The sensors 10 are a detection device and an input device provided in a vehicle. Examples of the sensor 10 include a temperature sensor that measures temperatures of an engine, a battery, coolant, and the interior and exterior of the vehicle, and the like, respectively, a voltage sensor and a current sensor that measure the voltage and the current of the battery, respectively, or an RPM sensor that measures RPMs of an engine and a motor, respectively. Alternatively, examples of the sensor 10 include a touch sensor that is provided on a door handle and detects a touch operation by a user, an acceleration sensor that detects acceleration or inclination of the vehicle, an illumination sensor that measures illumination outside the vehicle, a sensor that detects an amount of depression of a brake pedal, a sensor that detects an accelerator position angle, and a steering angle sensor. Alternatively, examples of the sensor 10 include a camera, infrared sensor, and ultrasonic sensor that respectively detect an occupant inside a vehicle, or a road or a target outside the vehicle, and a radar that detects the position or orientation of the target outside the vehicle. Alternatively, examples of the sensor 10 include a button or a switch that receives an operation of a user, and an antenna that receives radio waves from portable devices inside and outside the vehicle. As such, all the detection devices and input devices included in the vehicle may be the sensors 10. The number N of the sensors 10 is not particularly limited.

The sensors 10 are connected to the first bus 11. Based on the content detected by each sensor, the sensors 10 can generate sensing data that indicates the detected content and transmit the generated sensing data to the first bus 11.

The actuators 20 are various operation mechanisms provided in a vehicle. Examples of the actuator 20 include an output mechanism of the braking and driving force of a vehicle, such as the powertrain including a brake, an engine and a transmission and the like, and of the steering force of a vehicle, such as power steering, an automatic lock mechanism of a door, a wiper, various lights, a direction indicator, an air conditioner, a cooler, a converter or relay that controls a power supply path from a power source, and a display, a meter or a warning light that presents information to a user. As such, all the devices that generate any physical change to the vehicle or equipment provided in the vehicle, or that produce an effect may be the actuators 20. The number M of the actuators 20 is not particularly limited.

The actuators 20 are connected to the second bus 21. The actuators 20 can receive, from the second bus 21, control data that indicates the control content on the actuator 20 itself and operate based on the received control data.

The central ECU 30 is an operation device including a processor. The central ECU 30 performs an operation based on the sensing data, and generates the control data. Examples of the content of the operation include driving assistance functions that was individually performed by conventional ECUs, such as collision avoidance, lane keeping, front vehicle following, and speed keeping, and various types of vehicle control such as operation control of an engine, a transmission, cooler, or an air conditioner, charging and discharging control of a battery, headlamp lighting according to illumination, door unlocking permission by authentication of a portable device (an electronic key), and presentation of information on a user.

As described above, the functions of the plurality of conventional ECUs that implement the driving assistance function or the like are integrated into the central ECU 30. The central ECU 30 aggregates the sensing data, and based on the sensing data, integrally controls the plurality of actuators 20. Conventionally, for example, a collision avoidance ECU and a lane keeping ECU have been independently provided. The function of the collision avoidance ECU is to acquire sensing data from the ultrasonic sensor and detect an obstacle, and then control a power steering actuator, a brake actuator, and the like in order to avoid a collision. The function of the lane keeping ECU is to acquire sensing data (captured image) from the camera, and control a power steering actuator and the like in order to maintain traveling in the lane. Moreover, when each of the control content acquired by the above ECUs, such as a steering instruction, is not compatible with each other, another ECU determines which control content is prioritized. However, the central ECU 30 can acquire the sensing data from the ultrasonic sensor, the camera, and the like, and implement both the collision avoidance function and the lane keeping function. Further, the central ECU 30 can perform an advanced process of adjusting and integrating the control content for steering based on the importance, priority, and the like of each function. As such, the central ECU 30 can perform control in which the control content for a plurality of functions is appropriately integrated on each actuator 20, such as the power steering.

In addition, functions of other ECUs other than the driving assistance function may be appropriately integrated into the central ECU 30. For example, some or all of the functions of the above-described conventional sensor ECU or actuator ECU may be appropriately integrated into the central ECU 30.

Moreover, the above-described processor is, for example, a device including a large-scale integrated circuit that can operate based on a clock signal, and perform an advanced and large-scale process including acquisition, calculation, comparison, and transmission, and the like, of data according to a predetermined command set. The processor includes a central processing unit (CPU), a microcontroller or the like. By providing the central ECU 30, the number of ECUs can be reduced, and as such, the number of high-cost components, such as processors included in the ECUs, can be reduced.

The central ECU 30 typically is operated by executing an application program. The application program can run application programs used in a plurality of conventional ECUs in parallel. However, corresponding to integration of functions into the central ECU 30, processing of the application programs may be optimized or be more efficient. For example, when there is a possibility of a collision, it is also possible to prioritize an operation of collision avoidance, and cancel an operation of front vehicle following or lane keeping.

The central ECU 30 is connected to the third bus 31. The central ECU 30 receives the sensing data from the third bus 31, and transmits the control data to the third bus 31. In addition to the central ECU 30, one or more auxiliary ECUs may be connected to the third bus 31 as needed.

The auxiliary ECU is an operation device including a processor. The auxiliary ECU has an auxiliary function to the central ECU 30, such as a log acquisition function of acquiring and storing the sensing data and the control data. The auxiliary ECU may be additionally provided for expanding the functions of the central ECU 30 or for implementing new functions not provided to the central ECU 30, and may transmit control data for expansion or implementation of the functions.

The central ECU 30 and the auxiliary ECU may communicate with each other using inter-ECU data. In other words, the central ECU 30 and the auxiliary ECU may transmit the inter-ECU data to the third bus 31 or receive the inter-ECU data from the third bus 31. For example, the central ECU 30 may instruct, using the inter-ECU data, the auxiliary ECU having the log acquisition function to start and end the log acquisition process.

Further, at least a part of the actuators 20 may communicate with each other using inter-actuator data. In other words, the actuator 20 may transmit the inter-actuator data to the second bus 21 or receive the inter-actuator data from the second bus 21. In this case, although the actuator 20 basically operates based on the control data, the actuator 20 can also acquire, for example, operation state of other actuators 20 from the inter-actuator data, and operate based on the acquired operation state, or the like. In addition, if necessary for generating the inter-actuator data, the actuator 20 may acquire data equivalent to the sensing data from the sensor 10 via a signal line or the like directly connected to the sensor 10.

For example, when each of the actuators 20 provided in the powertrain, the brake, and the power steering directly acquires the operation state of one another from the inter-actuator data with a very low delay and operates based on the inter-actuator data as well as the control data from the central ECU 30, compared to an operation based solely on the control data, the control content indicated by the control data is appropriately interpolated and corrected, responsiveness and coordination to changes in the state of one another are improved, such that a side slip or the like of the vehicle can be prevented, and thus driving stability and ride comfort can be improved.

The repeater 40 is connected to the first bus 11, the second bus 21, and the third bus 31. The repeater 40 includes a first circuit 41 and a second circuit 42. The first circuit 41 uses the first bus 11 as an input source and uses the third bus 31 as an output destination. The second circuit 42 uses the third bus 31 as an input source and uses the second bus 21 as an output destination.

Hereinafter, the sensor 10, the actuator 20, the central ECU 30, and the auxiliary ECU will be collectively and appropriately referred to as nodes.

Figure 2:
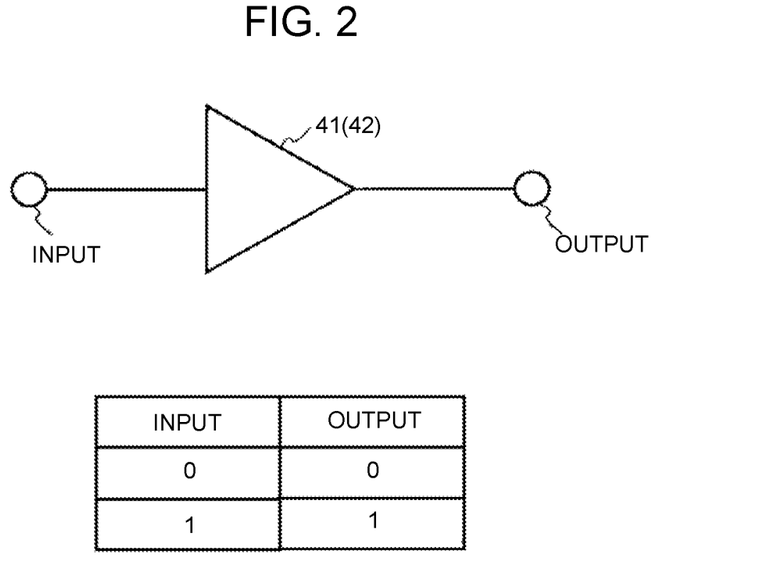
FIG. 2 is a diagram illustrating operations of a first circuit and a second circuit according to one embodiment of the present disclosure.

FIG. 2 is a diagram illustrating operations of the first circuit 41 and the second circuit 42 that are included in the repeater 40. The operations of the first circuit 41 and the second circuit 42 are the same, and can be implemented with the same configuration. For both the first circuit 41 and the second circuit 42, when a signal value represented by an input signal is zero, a signal value represented by an output signal is also zero, and when the signal value represented by the input signal is one, the signal value represented by the output signal is also one. Further, the first circuit 41 and the second circuit 42 shape and output a waveform of the input signal.

Figure 3:
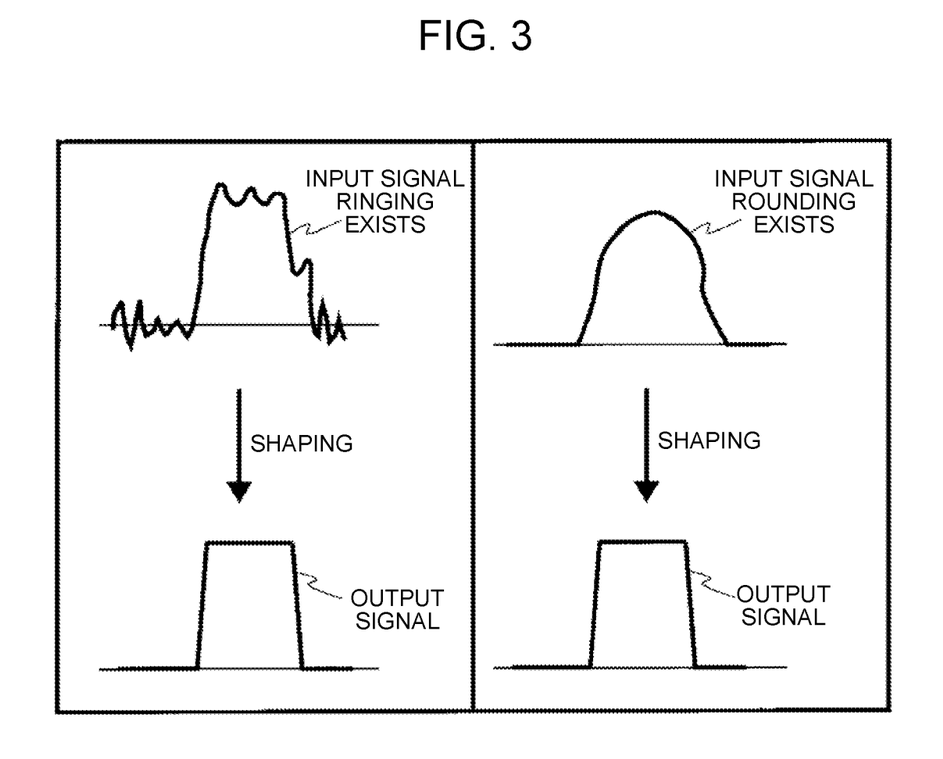
FIG. 3 is a diagram illustrating examples of waveform shaping performed by the first circuit and the second circuit according to one embodiment of the present disclosure.

FIG. 3 illustrates examples of waveform shaping performed by the first circuit 41 and the second circuit 42. Generally, while the input signal flows on the bus, the waveform distortion, such as ringing (oscillation of the waveform), rounding (destruction of the waveform), and attenuation of the waveform, is generated due to a characteristic of the bus, a reflection from connected nodes, and the like, and consequently, communication quality may deteriorate due to a data error. The first circuit 41 and the second circuit 42 generate the waveform having an amplitude and shape of a regulated signal waveform, which represents the same signal value as the signal value of the input signal, without ringing or rounding, and output the waveform as an output signal, thereby curbing deterioration of the communication quality.

The repeater 40 shapes the waveform of the sensing data input from the first bus 11 via the first circuit 41, and outputs the sensing data to the third bus 31 such that the sensing data passes from the sensor 10 to the central ECU 30 (auxiliary ECU). Further, the repeater 40 shapes the waveform of the control data input from the third bus 31 via the second circuit 42, and outputs the control data to the second bus 21 such that the control data passes from the central ECU 30 (auxiliary ECU) to the actuator 20.

The repeater 40 blocks the flow of data from the third bus 31 to the first bus 11, and the flow of data from the second bus 21 to the third bus 31. In addition, the repeater 40 shapes the waveform of the data that passes through the repeater 40, as described above. Thus, the repeater 40 shortens the wiring length of each bus, and divides the bus of the network system 1 into three in order to curb the waveform distortion due to the characteristic of the bus, the signal reflection, and the like. The method of implementing a repeater 40 is not limited to the above. However, since the repeater 40 simply passes data one way while shaping the waveform thereof, it is implemented by a logic circuit with a relatively simple configuration that does not include a processor. A logic circuit with a relatively simple configuration refers to, for example, an electronic circuit mainly consisting of a logic element that performs a logic operation according to a voltage pattern representing a digital signal, and it is operable even when a clock signal, a command set, or the like, is not given. The time required to start the repeater 40 consisting of a simple logic circuit is about several hundred nanoseconds to several microseconds whereas the time required to start the gateway including the processor is generally several milliseconds or more. In addition, the repeater 40 consisting of a simple logic circuit has a lower transmission delay than a gateway that performs a data transmission process by performing a large amount of operations according to a command set. Therefore, by using the repeater 40 instead of the gateway, it is possible to prevent the data transmission from missing and significantly reduce the delay.

In addition, the network system 1 does not require all the sensors and actuators provided in the vehicle to be connected thereto, but it is acceptable if necessary parts are connected to the network system 1, depending on the functions of the central ECU 30. Further, the functions of the central ECU 30 do not need to include all functions of the plurality of conventional ECUs, and may include some functions of the plurality of conventional ECUs as long as the number of ECUs can be reduced.

Moreover, the network system 1 excludes other network systems to be provided in the vehicle. The vehicle may be provided with the other work systems. The network system 1 may be connected to other network systems via a gateway or the like.

Traffic Volume

In the above-described repeater 40, the sensing data flowing on the first bus 11 also flows on the second bus 21 via the third bus 31. In other words, unnecessary sensing data flows on the second bus 21. However, as a characteristic of the network system 1, when the amount of the control data or inter-actuator data that need to flow on the second bus 21 is small, and the time for which the second bus 21 is empty is long (a bus load is low), no particular fault occurs even when the sensing data flows on the second bus 21.

On the other hand, as a characteristic of the network system 1, when the amount of the control data or the inter-actuator data that need to flow on the second bus 21 is large, and the time for which the second bus 21 is empty is short (the bus load is high), the sensing data that is not necessary to flow on the second bus 21 may be inhibited from flowing thereon. In that case, a selector circuit 43 may be provided as below.

Figure 4:
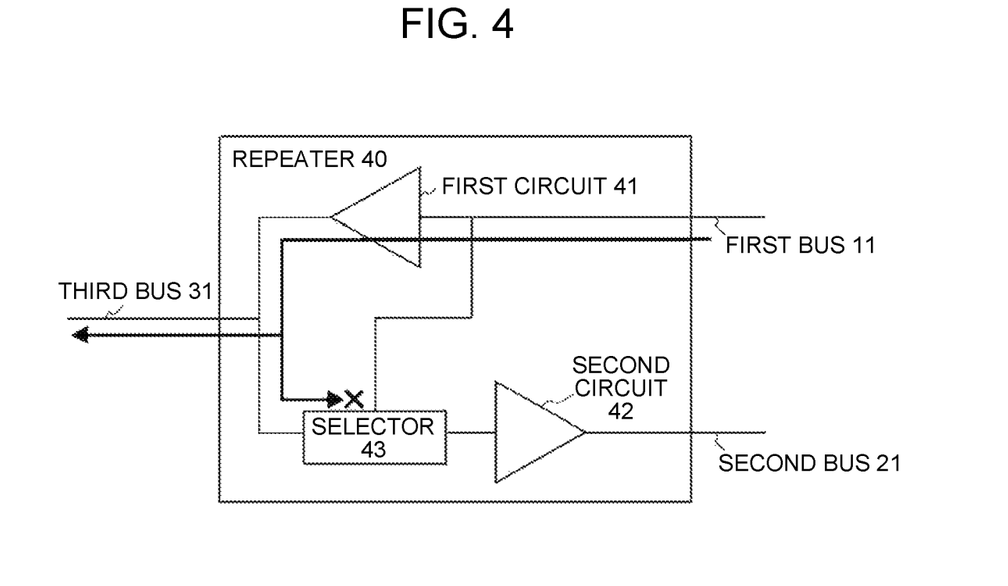
FIG. 4 illustrates an exemplified configuration of a repeater provided with a selector, according to one embodiment of the present disclosure.

FIG. 4 illustrates one example of a configuration in which the selector circuit 43 is provided in the repeater 40, illustrated in FIG. 1. Each data flowing on the third bus 31 and the first bus 11 is input into the selector circuit 43. When the data that has passed through the repeater 40 from the first bus 11 flows on the third bus 31, the selector circuit 43 inhibits the a passage of the data from the third bus 31 to the second bus 21. FIG. 4 illustrates arrows representing the flow of the data that has passed through the repeater 40 from the first bus 11. As illustrated in FIG. 4, the data that has passed through the repeater 40 from the first bus 11 flows on the third bus 31 but does not flow on the second bus 21.

As such, the bus load of the second bus 21 can be reduced, more control data or inter-actuator data can flow thereon. Since the selector circuit 43 performs a simple process of switching between blocking and passing a signal based on whether the signal on the third bus 31 is the same as the signal on the first bus 11, it can be implemented by a logic circuit with a relatively simple configuration that does not include a processor. Furthermore, although the transmission delay of the first circuit 41 is low, the selector circuit 43 is designed by taking into consideration the transmission delay of the first circuit 41, if needed, when comparing the data flowing on the third bus 31 with the data flowing on the first bus 11.

As described above, to curb the bus load of the second bus 21, the selector circuit 43 may be provided to the repeater 40. When the bus load of the second bus 21 is sufficiently low and the need to further curb the load is also low, a selector circuit 43 is not provided, and the sensing data is allowed to flow on the second bus 21, thereby simplifying the configuration of the repeater 40.

Function of Network

In the present embodiment, since the repeater 40 partially blocks the flow of the data, an effect from the partial blocking may occur for some communication methods. However, the effect can be appropriately handled, as needed. Hereinafter, in particular, a case in which the network system 1 performs communication in compliance with the CAN standard will be described.

Figure 5:
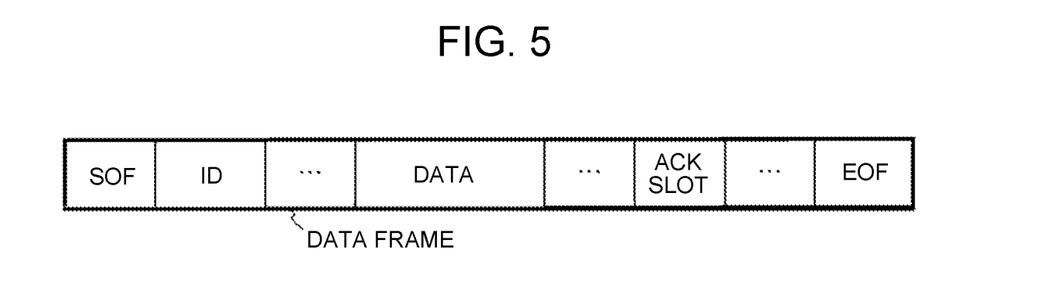
FIG. 5 is a table illustrating an overview of a frame configuration of a controller area network (CAN) standard.

The first bus 11, the second bus 21, and the third bus 31 are examples, and are two-wire type twisted pair cables compatible with the CAN standard. Each data such as the sensing data and the control data in the present embodiment flows on each bus in units, referred to as frames. FIG. 5 schematically illustrates an example of a configuration of such a frame. The frame includes fields such as an ID, a data body, and an ACK slot between the SOF indicating a start of the frame and the EOF indicating an end of the frame. On the bus, the frame is expressed by a rectangle wave-shaped digital signal in which each bit is specified by two differential voltage states, a dominant state (0) or a recessive state (1).

ACK Transmission

An ACK slot is a I-bit long field. When a transmitting node, which transmits data, transmits the ACK slot in the frame as a recessive signal, and a receiving node, which receives data, correctly receives up to the part transmitted before the ACK slot in the frame, the receiving node transmits a dominant signal at the time overlapping the ACK slot (send the ACK).

When the recessive signal and the dominant signal are simultaneously transmitted from different nodes, the two signals become dominant signals on the bus. Thus, when the ACK slot is dominant, the transmitting node can confirm that the data transmitted by itself is received by the receiving node. As such, when the receiving node transmits an ACK, an allowable range of the waveform distortion or transmission delay of a signal is limited so that the receiving node can send the ACK just in the time with the ACK slot of the frame.

In the present embodiment, for example, even when the central ECU 30 sends the ACK on an ACK slot of the sensing data from the sensor 10, the ACK is blocked by the repeater 40, and does not reach the sensor 10. In addition, for example, even when the actuator 20 sends the ACK on an ACK slot of the control data from the central ECU 30, the ACK is blocked by the repeater 40, and does not reach the central ECU 30. Therefore, in the present embodiment, it is assumed that at least a method of reception confirmation using the ACK slot is not employed for the sensing data and the control data flowing on the plurality of buses across the repeater 40.

When reception confirmation using the ACK slot is not used, the allowable range of the waveform distortion or transmission delay of the signal can be expanded, compared to a case in which reception confirmation using the ACK slot is used, thereby having an advantage that a number of nodes can be connected by one bus. Further, there is no other effect other than that an ACK does not reach the transmitting node even when the receiving node sends the ACK. Therefore, it is not necessary to cause the receiving node not to send the ACK by modifying the conventional design of sending the ACK.

Even when the sensor 10 cannot confirm that the central ECU 30 is receiving the sensing data from the sensor 10, no particular fault occurs. Further, when a fault occurs because the actuator 20 cannot receive the control data from the central ECU 30, the central ECU 30 can, for example, monitor the state of the actuator 20 via the sensor 10 to be described below. Therefore, the fault can be detected.

Network Management

Various network management methods applicable to the CAN standard network system are proposed. For example, each node notifies other nodes of its state by periodically transmitting predetermined data, referred to as an NM message, on the bus. When one of the nodes breaks away from the network due to a disconnection or the like, the other nodes cannot receive the NM message from that node, and can detect the break-away of the node based on the reception failure.

In the present embodiment, at least the central ECU 30 may collectively acquire the states of the sensor 10 and the actuator 20. When the sensor 10 and the auxiliary ECU transmit the NM message, the central ECU 30 can receive the NM message. Thus, the conventional network management method using the NM message can be employed for the sensor 10 and the auxiliary ECU. However, when the actuator 20 transmits the NM message, the NM message is blocked by the repeater 40 and the central ECU 30 cannot receive the NM message.

Here, the conventional network management method using the NM message is not employed for the actuator 20. In the present embodiment, a sensor 10, having a function of acquiring the connection state between the actuator 20 and the network, and other states, and transmitting the states as sensing data, is provided. As such, the central ECU 30 can monitor the state of the actuator 20 via the sensor 10.

Moreover, the NM message can include sleep mode availability information, indicating whether the node can shift to a sleep mode, which is a low power consumption mode. Each node can perform processes such as determining whether to actually shift to the sleep mode based on, for example, the sleep mode availability information based on the operation status of the node itself and the sleep mode availability information included in the NM message of another node.

In the present embodiment, as in the above-described state monitoring, the central ECU 30 can acquire the sleep mode availability information from the sensor 10 and the auxiliary ECU, using the NM message. In addition, regarding the actuator 20, if necessary, as in the above-mentioned state monitoring, the sensor 10 acquires the state of the actuator 20, generates the sleep mode availability information of the actuator 20 based on the state of the actuator 20, and transmits, as the sensing data, the generated sleep mode availability information to the central ECU 30.

For example, when all the nodes are determined to be able to shift to the sleep mode, the central ECU 30 can stop power supply to the entire network system 1, and shift all the nodes to the sleep mode.

Adjustment

In the CAN standard, for example, by using a carrier sense multiple access/collision avoidance (CSMA/CA) method, each node basically avoids a collision between pieces of data by not transmitting data while data transmission to the bus is detected by another node.

However, when there is no data flowing on the bus, a plurality of nodes may simultaneously transmit data. In this case, a data collision may occur. In order to avoid the data collision, an adjustment of data transmission based on a data priority is performed. At a position near the start of the frame, a multi-bit long field, referred to as an ID indicating an identifier of a source node, is provided. A priority of the frame can be represented by a value of the ID.

When a plurality of nodes simultaneously transmits data, and the dominant signal (0) and the recessive signal (1) are simultaneously transmitted on the bus, the signals become the dominant signal (0) on the bus. When each node detects a difference between an ID of the data transmitted by the node itself and an ID of data on the bus, each node that has transmitted the data interrupts the data transmission. Each node can retransmit the data of which the transmission has been interrupted when there is no data flowing on the bus thereafter. In such an adjustment system, as the value of the ID is smaller, a transmission interruption is less likely to occur and the priority becomes higher.

In the present embodiment, between the nodes connected to the same bus among the first bus 11, the second bus 21, and the third bus 31, it is possible to avoid collision of the data and adjust the data transmission, using the above-described method. However, between the nodes connected to different buses, since the data flow is partially restricted, it may be possible to avoid the data collision and to adjust data transmission using the above-described method. Hereinafter, the sensing data and the control data will be considered as examples.

Figure 6:
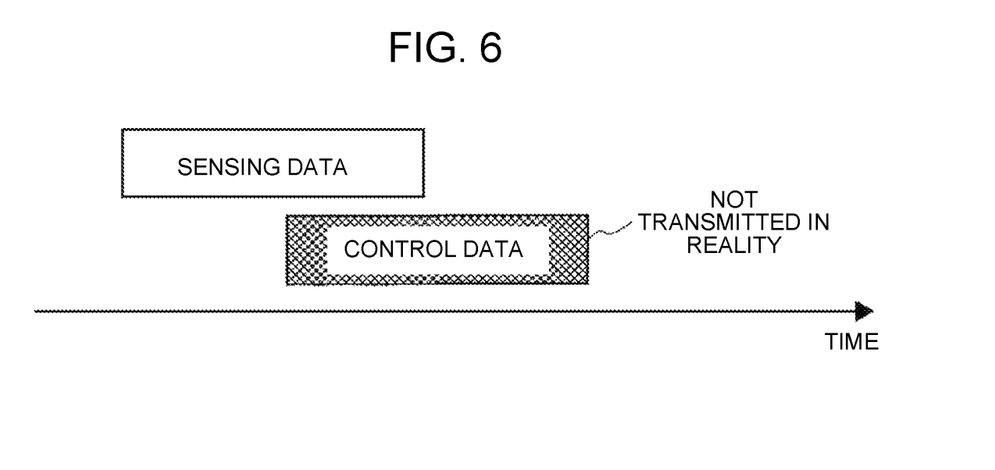
FIG. 6 is a diagram illustrating an example of collision avoidance of data and an adjustment of a data transmission, according to one embodiment of the present disclosure.

A first case is considered with reference to FIG. 6. In this case, the sensing data is transmitted prior to the control data and their transmission periods overlap. Since the central ECU 30 is able to receive the sensing data and not transmit the control data while receiving the sensing data, it is possible to avoid a collision using the above-described method, similar to the conventional manner. Therefore, the transmission of the control data while the sensing data is flowing on the bus, as illustrated in FIG. 6, does not occur in reality. In other words, the transmission of the control data hatched in FIG. 6 is avoided.

Figure 7:
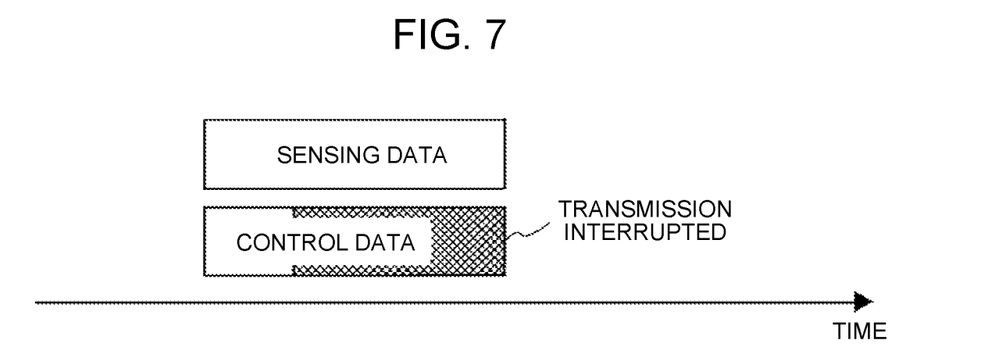
FIG. 7 is a diagram illustrating another example of collision avoidance of the data and the adjustment of the data transmission, according to one embodiment of the present disclosure.

A second case is considered with reference to FIG. 7. In this case, the transmission of the control data and the transmission of the sensing data are simultaneously started. Since the control data is blocked by the repeater 40 and does not reach the sensor 10, the sensor 10 cannot detect the simultaneous transmission. Moreover, the sensing data passes through the repeater 40 and reaches the central ECU 30. Here, when the priority of the sensing data is lower than the priority of the control data, the ID of the control data frame is not changed by the ID of the sensing data frame on the third bus 31. Thus, the central ECU 30 cannot detect the simultaneous transmission, either. Therefore, the central ECU 30 continues to transmit the control data, and a collision between the control data and the sensing data may occur on the third bus 31.

To prevent the collision, the priority of the data transmitted by each sensor 10 connected to the first bus 11 such as the sensing data is made higher than the priority of the data transmitted by the central ECU 30 or the auxiliary ECU connected to the third bus 31 such as the control data or the inter-ECU data.

When the priority of the sensing data is higher than the priority of the control data, the ID of the control data frame is changed by the ID of the sensing data frame on the third bus 31. By detecting the change, the central ECU 30 detects the simultaneous transmission, and interrupts the transmission of the control data. As such, it is possible to avoid the data collision. Therefore, in FIG. 7, the transmission of the control data is interrupted, and the sensing data is prioritized and flows on the bus. In other words, the transmission of the part after the ID of the control data, that is, the hatched part of the control data in FIG. 7 is interrupted.

Figure 8:
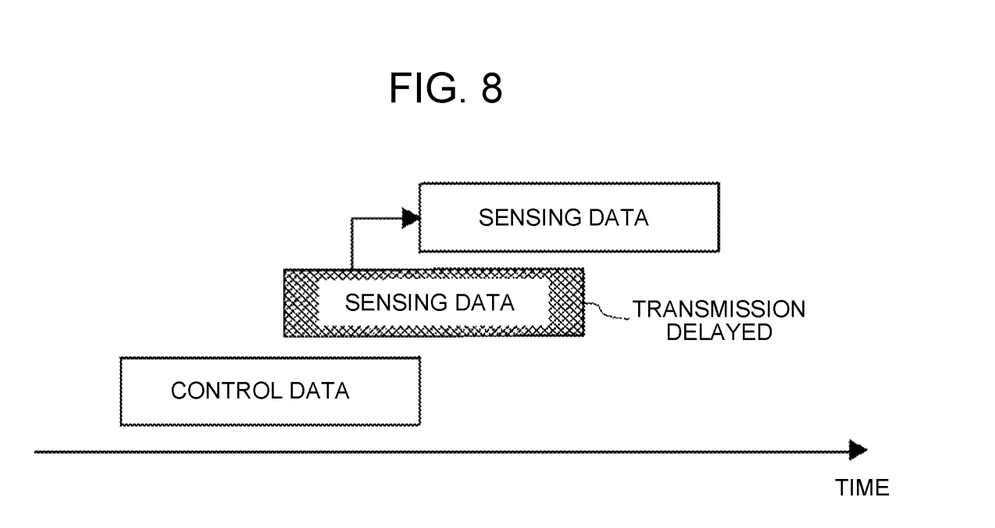
FIG. 8 is a diagram illustrating yet another example of collision avoidance of the data and the adjustment of the data transmission, according to one embodiment of the present disclosure.

A third case is considered with reference to FIG. 8. In this case, the sensing data is transmitted after the control data and the transmission periods of the two pieces of data overlap. As described above, since the control data does not reach the sensor 10, the sensor 10 may transmit the sensing data (the sensing data that is hatched in FIG. 8) while the central ECU 30 is transmitting the control data.

Figure 9:
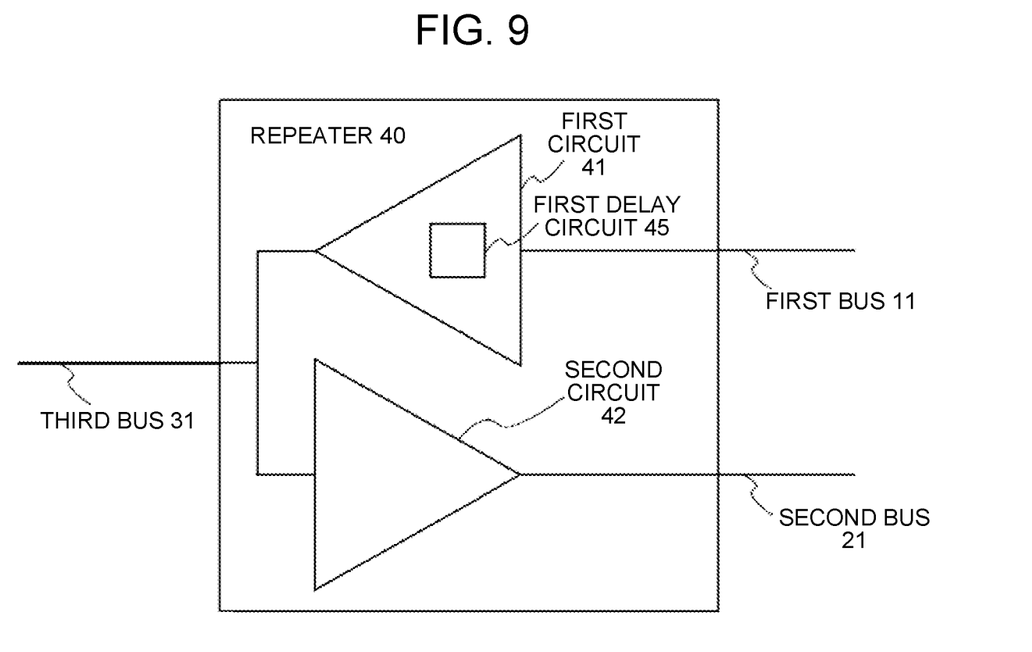
FIG. 9 is a diagram illustrating an exemplified configuration of the repeater provided with a delay circuit, according to one embodiment of the present disclosure.

Here, a first delay circuit 45 is provided in the first circuit 41 of the repeater 40. FIG. 8 illustrates an effect of a response to a case in which the sensing data is transmitted after the control data and transmission periods of the two pieces of data overlap. FIG. 9 illustrates an example of a configuration in which the first delay circuit 45 is provided in the repeater 40 illustrated in FIG. 1. As in the non-hatched sensing data illustrated in FIG. 8, the sensing data input from the first bus 11 to the repeater 40 is output, by the first delay circuit 45, to the third bus 31 after the transmission of the control data is completed. In other words, when the sensing data is input from the first bus 11 while the control data input from the third bus 31 is passing through the repeater 40, the repeater 40 delays the passage of the input sensing data until the passage of the input control data is completed.

When the central ECU 30 tries to transmit a next control data to the third bus 31, the central ECU 30 can cause the transmission of the next control data to stand by or interrupt in order to avoid a collision between the next control data and the sensing data output from the repeater 40 to the third bus 31. As such, the flow of data on the third bus 31 is adjusted.

In addition, the first delay circuit 45 monitors the third bus 31 after the input of the sensing data, and may curb the output of the sensing data while data is flowing on the third bus 31. When the first delay circuit 45 detects data not flowing on the bus 31, the first delay circuit 45 may allow the output of the sensing data. When the first delay circuit 45 detects the data flowing on the third bus 31 after the input of the sensing data the first delay circuit 45 may allow the output of the sensing data after standing by for, for example, a predetermined time corresponding to the time required to transmit one frame.

Since the first delay circuit 45 performs a simple process of delaying a small amount of data based on the above simple condition, the first delay circuit 45 can be implemented by a logic circuit having a relatively simple configuration that does not include a processor. As such, it is possible to avoid data collisions or adjust the data transmission between the nodes connected to the first bus 11 and the nodes connected to the third bus 31.

Furthermore, when the actuator 20 transmits and receives the above-described inter-actuator data, the inter-actuator data may collide with data flowing on the repeater 40 from the third bus 31 to the second bus 21, such as the control data. However, as in the case of the sensing data and the control data described above, a data collision can be avoided and a data transmission can be adjusted. Hereinafter, the control data and the inter-actuator data will be considered as examples.

In a first case, a case in which the control data is transmitted prior to the inter-actuator data, and the transmission periods of the two pieces of data overlap is considered. Since the actuator 20 is able to receive the control data and not transmit the inter-actuator data while receiving the control data, it is possible to avoid a collision using the above-described method, similar to the conventional manner. Therefore, the control data is transmitted prior to the inter-actuator data, and the transmission periods of the two pieces of data do not overlap in reality.

In a second case, a case in which the transmission of the inter-actuator data and the transmission of the control data are simultaneously started is considered. Since the inter-actuator data is blocked by the repeater 40 and does not reach the central ECU 30, the central ECU 30 cannot detect the simultaneous transmission. Moreover, the control data passes through the repeater 40 and reaches the actuator 20. However, when the priority of the control data is lower than the priority of the inter-actuator data, the ID of the inter-actuator data frame is not changed by the ID of the control data frame on the second bus 21. Thus, the actuator 20 cannot detect the simultaneous transmission, either. Therefore, the actuator 20 continues to transmit the inter-actuator data, and the inter-actuator data the control data may collide on the second bus 21.

To prevent the collision, the priority of the data transmitted by the central ECU 30 or the auxiliary ECU connected to the third bus 31 such as the control data or the inter-ECU data is made higher than the priority of the data transmitted by the actuator 20 connected to the second bus 21 such as the inter-actuator data.

When the priority of the control data is higher than the priority of the inter-actuator data, the ID of the inter-actuator data frame is changed by the ID of the control data frame on the second bus 21. By detecting the change, the actuator 20 detects the simultaneous transmission, and interrupts the transmission of the inter-actuator data. As such, it is possible to avoid the data collision.

Next, a case in which the control data is transmitted after the inter-actuator data, and the transmission periods of the two pieces of data overlap is considered. Since the inter-actuator data does not reach the central ECU 30, the central ECU 30 may transmit the control data while the actuator 20 is transmitting the inter-actuator data.

Figure 10:
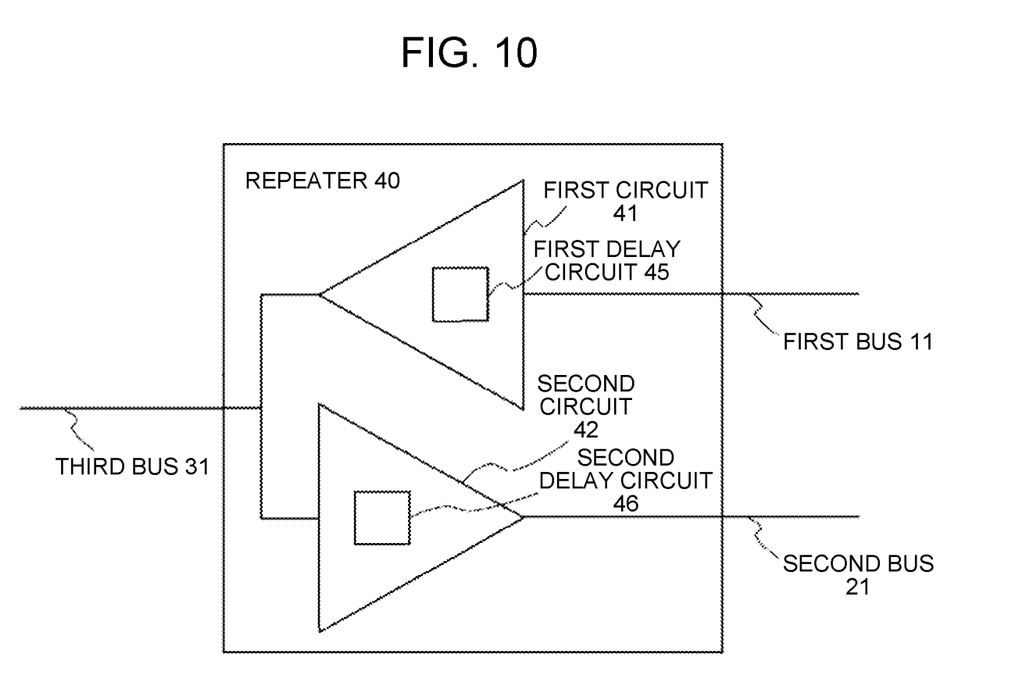
FIG. 10 is a diagram illustrating another exemplified configuration of the repeater provided with delay circuits, according to one embodiment of the present disclosure.

Here, a second delay circuit 46 is provided in the second circuit 42 of the repeater 40. FIG. 10 illustrates an example of a configuration in which the second delay circuit 46 is provided in the repeater 40 illustrated in FIG. 9. The control data input from the third bus 31 to the repeater 40 is output by the second delay circuit 46 to the second bus 21 after the flow of the inter-actuator data on the second bus 21 is completed. In other words, when the control data is input from the third bus 31 while the inter-actuator data is flowing on the second bus 21, the repeater 40 delays the passage of the input control data until the flow of the inter-actuator data is completed.

When the actuator 20 tries to transmit a next inter-actuator data to the second bus 21, the actuator 20 can cause the transmission of the next inter-actuator data to stand by or interrupts in order to avoid a collision between the next inter-actuator data and the control data output from the repeater 40 to the second bus 21. As such, the flow of data on the second bus 21 is adjusted.

In addition, the second delay circuit 46 monitors the second bus 21 after the input of the control data, and may curb the output of the control data while data is flowing on the second bus 21. When the second delay circuit 46 detects data not flowing on the second bus 21, the second delay circuit 46 may allow the output of the control data. When the second delay circuit 46 detects the data flowing on the second bus 21 after the input of the control data, the second delay circuit 46 may allow the output of the control data after standing by for, for example, a predetermined time corresponding to the time required to transmit one frame.

Similar to the first delay circuit 45, since the second delay circuit 46 performs a simple process of delaying a small amount of data based on the above simple condition, the second delay circuit 46 can be implemented by a logic circuit having a relatively simple configuration that does not include a processor. As such, it is possible to avoid data collisions or adjust the data transmission between the nodes connected to the third bus 31 and the nodes connected to the second bus 21.

Moreover, when the first delay circuit 45 (or additionally, the second delay circuit 46) is provided and the above-described selector circuit 43 is further provided, the selector circuit 43 is designed by taking into consideration the effect of the transmission delay by the first delay circuit 45, if needed, when comparing the data flowing on the third bus 31 with the data flowing on the first bus 11.

Advantageous Effect

In the network system 1 according to the present disclosure, since the central ECU 30 performs operation processes for various functions of the vehicle, and integrates a plurality of functions and performs vehicle control, the number of ECUs can be reduced compared to the conventional case in which a number of ECUs are provided for each individual function. Accordingly, the number of processors can be reduced.

Further, by providing the repeater 40 having the relatively simple configuration using the logic circuit between the central ECU 30 and the sensor 10, and between the central ECU 30 and the actuator 20, it is possible to appropriately pass the data from a transmission source to a transmission destination while shaping the waveform of the data. In addition, since it is not necessary to perform a selection process on data to be transmitted by the processor using the gateway, the number of processors can be reduced by not performing the selection process.

In addition, since the time required to start the repeater 40 and the time required to pass the data after starting the repeater 40 are much shorter than the times required in case of the gateway, it is possible to prevent the data transmission from missing and significantly reduce the transmission delay, compared to a case in which the gateway is used.

Further, by reducing the number of ECUs and dividing the bus by the repeater 40, it is possible to sufficiently reduce the wiring length and signal reflection of each bus, and also curb the waveform distortion. Thus, all of the sensor 10, the actuator 20 and the central ECU 30 (the auxiliary ECU) do not have to be connected to two or more buses in order to further divide the bus, as disclosed in JP 2006-180109 A, and do not need to have a plurality of controllers of the bus. Therefore, costs can be reduced.

Moreover, by providing a simple selector circuit 43 in the repeater 40, as needed, it is possible to further curb the flow of unnecessary data, thereby reducing the bus load.

In addition, since the network system 1 according to the present disclosure can employ a conventional communication method such as the CAN standard by executing an appropriate design as described above, as needed, the network system 1 can be suitably applied to an in-vehicle network system. For example, an adjustment of a simultaneous transmission of two pieces of data can also be implemented by setting of the priority and providing a simple delay circuit in the repeater 40.

As described above, according to the present disclosure, it is possible to provide, for example, a network system mounted on a vehicle at a lower cost than the conventional method.

The present disclosure can be understood as a communication method in a network system, a repeater, and a vehicle provided with the network system, as well as the network system. Moreover, the present disclosure can also be applied to a network system other than the network system mounted on a vehicle.

The present disclosure is useful for a network system mounted on a vehicle or the like.

What is claimed is:
1. A network system for mounting on a vehicle, the system comprising:
    a plurality of sensors;

a first bus connected to the plurality of sensors, the first bus being used when the plurality of sensors transmit sensing data;

a plurality of actuators;

a second bus connected to the plurality of actuators, the second bus being used when the plurality of actuators receives control data;

a central electronic control unit configured to perform an operation based on the sensing data, and generate the control data as data for collectively performing vehicle control using the plurality of actuators;

a third bus connected to the central electronic control unit, the third bus being used when the central electronic control unit receives the sensing data and transmits the control data; and a repeater connected to the first bus, the second bus, and the third bus, the repeater being configured to block a flow of data from the third bus to the first bus and a flow of data from the second bus to the third bus, the repeater including:
- a first circuit connected to the first bus as an input source and the third bus as an output destination, the first circuit being configured to pass first data flowing on the first bus to the third bus while shaping a waveform of the first data; and
- a second circuit connected to the third bus as an input source and the second bus as an output destination, the second circuit being configured to pass second data flowing on the third bus to the second bus while shaping a waveform of the second data, wherein, while the data flow on the buses, waveform distortion is generated causing a deterioration of communication quality due to a data error, and shaping the waveforms of the data includes generating a regulated signal waveform having a same signal value as an input data signal without the waveform distortion, and outputting the regulated signal waveform as an output data signal, thereby curbing the deterioration of the communication quality.

2. The network system according to claim 1, wherein any one of the plurality of sensors is configured to monitor each of the plurality of actuators, and transmit a monitoring result as the sensing data.

3. The network system according to claim 1, wherein:
when a plurality of pieces of data is simultaneously transmitted, an order of the transmission of the plurality of pieces of data is adjusted based on a priority given to each of a plurality of frames, which are transmission units of the data, and a frame of the sensing data is given a priority higher than a frame of the control data; and the repeater is configured to, when the frame of the sensing data is input from the first bus while the frame of the control data input from the third bus is passing through the repeater, delay a passage of the frame of the sensing data until a passage of the frame of the control data is completed.

4. The network system according to claim 3, wherein:
at least a part of the plurality of actuators is configured to transmit or receive a frame of inter-actuator data using the second bus, and the frame of the control data is given a priority higher than the frame of the inter-actuator data; and the repeater is configured to, when the frame of the control data is input from the third bus while the frame of the inter-actuator data is flowing on the second bus, delay a passage of the frame of the input control data until a flow of the frame of the flowing inter-actuator data is completed.

5. The network system according to claim 1, wherein the repeater is configured not to pass data from the third bus to the second bus, when the data is flowing on the third bus and has passed through the repeater from the first bus.

6. The network system according to claim 1, wherein the repeater further includes a selector configured to inhibit a passage of the data from the third bus to the second bus when each of the data flowing on the third bus and the first bus is input into the selector, and when the data flowing on the third bus has flowed from the first bus.

7. The network system according to claim 1, wherein the first circuit includes a first delay circuit that delays a passage of data input into the first circuit.

8. The network system according to claim 7, wherein the second circuit includes a second delay circuit that delays a passage of data input into the second circuit.

9. The network system according to claim 1, wherein the waveform distortion is oscillation of the waveform, destruction of the waveform, or attenuation of the waveform.

10. The network system according to claim 9, wherein the waveform distortion is oscillation of the waveform, and the oscillation of the waveform is ringing.

11. The network system according to claim 9, wherein the waveform distortion is destruction of the waveform, and the destruction of the waveform is rounding.

* * * * *